(12) United States Patent
Yin et al.

(10) Patent No.: US 11,768,779 B2
(45) Date of Patent: Sep. 26, 2023

(54) CACHE MANAGEMENT BASED ON ACCESS TYPE PRIORITY

(71) Applicant: Advanced Micro Devices, Inc., Santa Clara, CA (US)

(72) Inventors: Jieming Yin, Bothell, WA (US); Yasuko Eckert, Redmond, WA (US); Subhash Sethumurugan, Minneapolis, MN (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/716,194

(22) Filed: Dec. 16, 2019

(65) Prior Publication Data

US 2021/0182216 A1 Jun. 17, 2021

(51) Int. Cl.
*G06F 12/12* (2016.01)
*G06F 12/126* (2016.01)

(52) U.S. Cl.
CPC .... *G06F 12/126* (2013.01); *G06F 2212/1021* (2013.01); *G06F 2212/1044* (2013.01); *G06F 2212/602* (2013.01)

(58) Field of Classification Search
CPC ........... G06F 12/126; G06F 2212/1021; G06F 2212/1044; G06F 2212/602
See application file for complete search history.

(56) References Cited

U.S. PATENT DOCUMENTS

| | | | |
|---|---|---|---|
| 2003/0079087 A1* | 4/2003 | Kuwata | G06F 12/127 711/136 |
| 2013/0151779 A1 | 6/2013 | Daly et al. | |
| 2017/0147496 A1* | 5/2017 | Sasanka | G06F 12/0817 |
| 2017/0220477 A1* | 8/2017 | Wang | G06F 11/3409 |
| 2018/0314646 A1* | 11/2018 | Xu | G06F 12/122 |
| 2019/0079877 A1 | 3/2019 | Gaur et al. | |
| 2021/0157730 A1* | 5/2021 | Hornung | G06F 12/0862 |

OTHER PUBLICATIONS

Wang et al., "Less is More: Leveraging Belady's Algorithm with Demand-based Learning", 2017, 4 pages, https://pdfs.semanticscholar.org/de53/6c7cbe9ce8edddb1482f1d1ac2d8478792e3.pdf. [Retrieved Oct. 24, 2019].
International Search Report and Written Opinion in International Application No. PCT/US2020/064884, dated Apr. 1, 2021, 9 pages.

* cited by examiner

*Primary Examiner* — Masud K Khan
(74) *Attorney, Agent, or Firm* — KOWERT HOOD MUNYON RANKIN AND GOETZEL PC; Rory D. Rankin

(57) ABSTRACT

Systems, apparatuses, and methods for cache management based on access type priority are disclosed. A system includes at least a processor and a cache. During a program execution phase, certain access types are more likely to cause demand hits in the cache than others. Demand hits are load and store hits to the cache. A run-time profiling mechanism is employed to find which access types are more likely to cause demand hits. Based on the profiling results, the cache lines that will likely be accessed in the future are retained based on their most recent access type. The goal is to increase demand hits and thereby improve system performance. An efficient cache replacement policy can potentially reduce redundant data movement, thereby improving system performance and reducing energy consumption.

20 Claims, 6 Drawing Sheets

CACHE MANAGEMENT BASED ON ACCESS TYPE PRIORITY

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

Computer systems use main memory that is typically formed with inexpensive and high density dynamic random access memory (DRAM) chips. However DRAM chips suffer from relatively long access times. To improve performance, data processors typically include at least one local, high-speed memory known as a cache. The cache stores blocks of data that are frequently accessed by the processor. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block varies according to design choice, and can be of any size. In addition, each of the terms "cache tag", "cache line tag", and "cache block tag" is interchangeable.

As caches have limited storage capacity, a cache management policy determines which cache lines are selected for replacement when a corresponding region of the cache is full. An efficient cache management policy is critical for improving application performance. However, some conventional cache management policies, such as those based on least recently used (LRU) principles, are less efficient when dealing with irregular accesses to cache lines, or require relatively complex circuitry implementations that can limit their applicability.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for cache management based on access type priority are disclosed herein. In one implementation, a system includes at least a processor and a cache. During a program execution phase, certain access types are more likely to cause demand hits in the cache than others. Demand hits are load and store hits to the cache. A run-time profiling mechanism is employed to find which access types are more likely to cause demand hits. Based on the profiling results, the cache lines that will likely be accessed in the future are retained based on their most recent access type. The goal is to increase demand hits and thereby improve system performance. An efficient cache replacement policy can potentially reduce redundant data movement, thereby improving system performance and reducing energy consumption.

Figure 1:
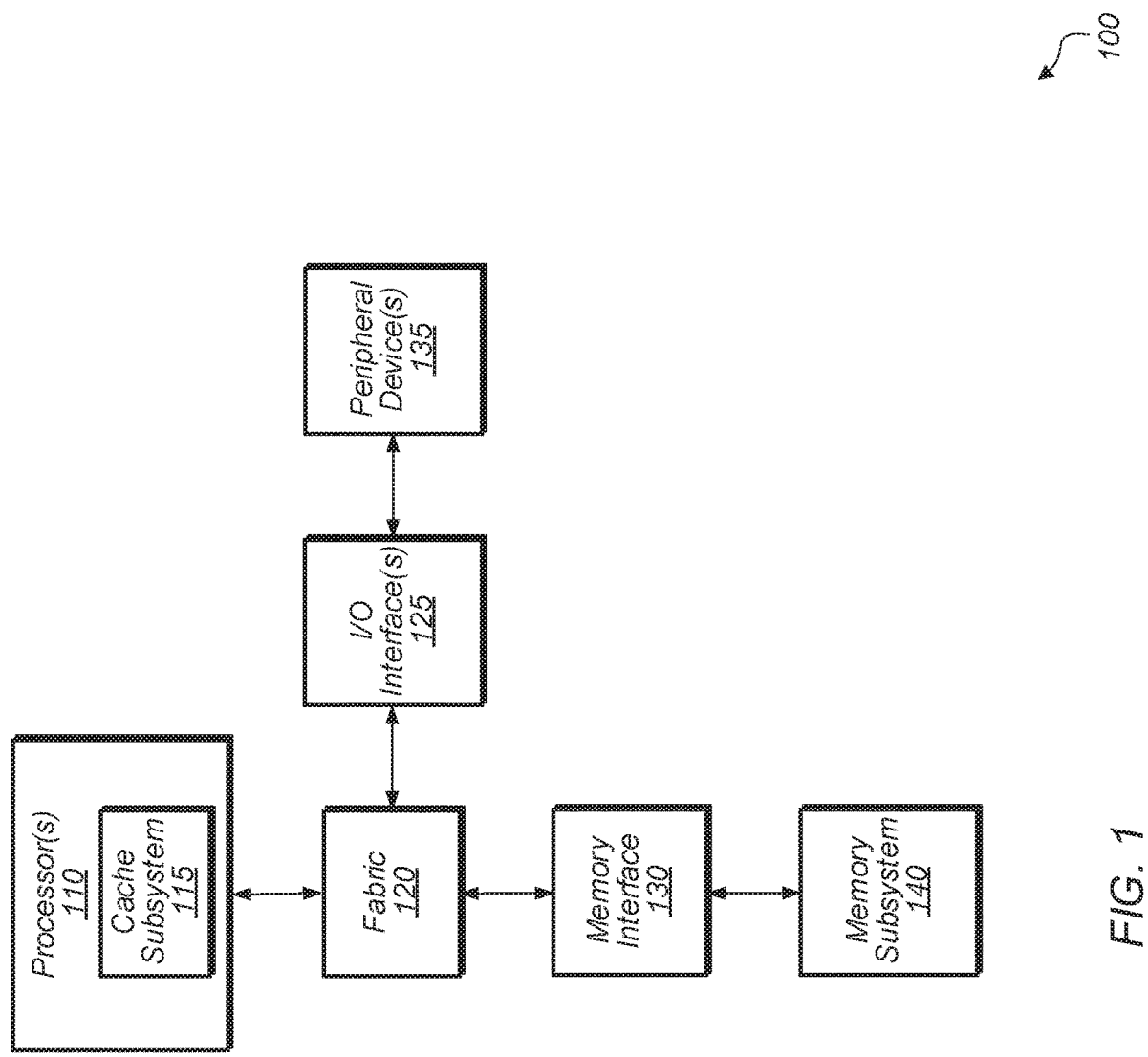
FIG. 1 is a block diagram of one implementation of a computing system.

Referring now to FIG. 1, a block diagram of one implementation of a computing system 100 is shown. In one implementation, computing system 100 includes at least processor(s) 110, fabric 120, input/output (I/O) interface(s) 125, memory interface 130, peripheral device(s) 135, and memory subsystem 140. In other implementations, computing system 100 can include other components, computing system 100 can omit an illustrated component, and/or computing system 100 can be arranged differently. In one implementation, each processor 110 includes a cache subsystem 115. Cache subsystem 115 has any number of cache levels with any of various types of caches which can vary according to the implementation. In some cases, one or more caches in the cache hierarchy of cache subsystem 115 can be located in other locations external to processor(s) 110.

In one implementation, one or more caches of cache subsystem 115 employ cache management schemes based on access type priority. For example, in one implementation, a cache controller determines which access types are more likely to cause demand hits. A demand hit is a hit to the cache caused by a load operation or a store operation. During a profiling phase, the cache controller determines which access type caused a lowest number of demand hits from among a plurality of access types. Then during replacement, the cache controller attempts to evict cache lines that have a recorded last access type that matches the access type with the least number of demand hits from among the plurality of access types. In other words, the cache controller dynamically determines a type of access that is most likely to precede a load hit or store hit to a cache line. Then, the cache controller protects cache lines that were most recently accessed by the access type that is most likely to precede a load hit or store hit. More details on the techniques used for managing cache replacement policy based on access type priority will be provided throughout the remainder of this disclosure.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). Memory subsystem 140 includes any number and type of memory devices. For example, the type of memory in memory subsystem 140 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. I/O interface(s) 125 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral device(s) 135 can be coupled to I/O interface(s) 125. Such peripheral device(s) 135 include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more of a given component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
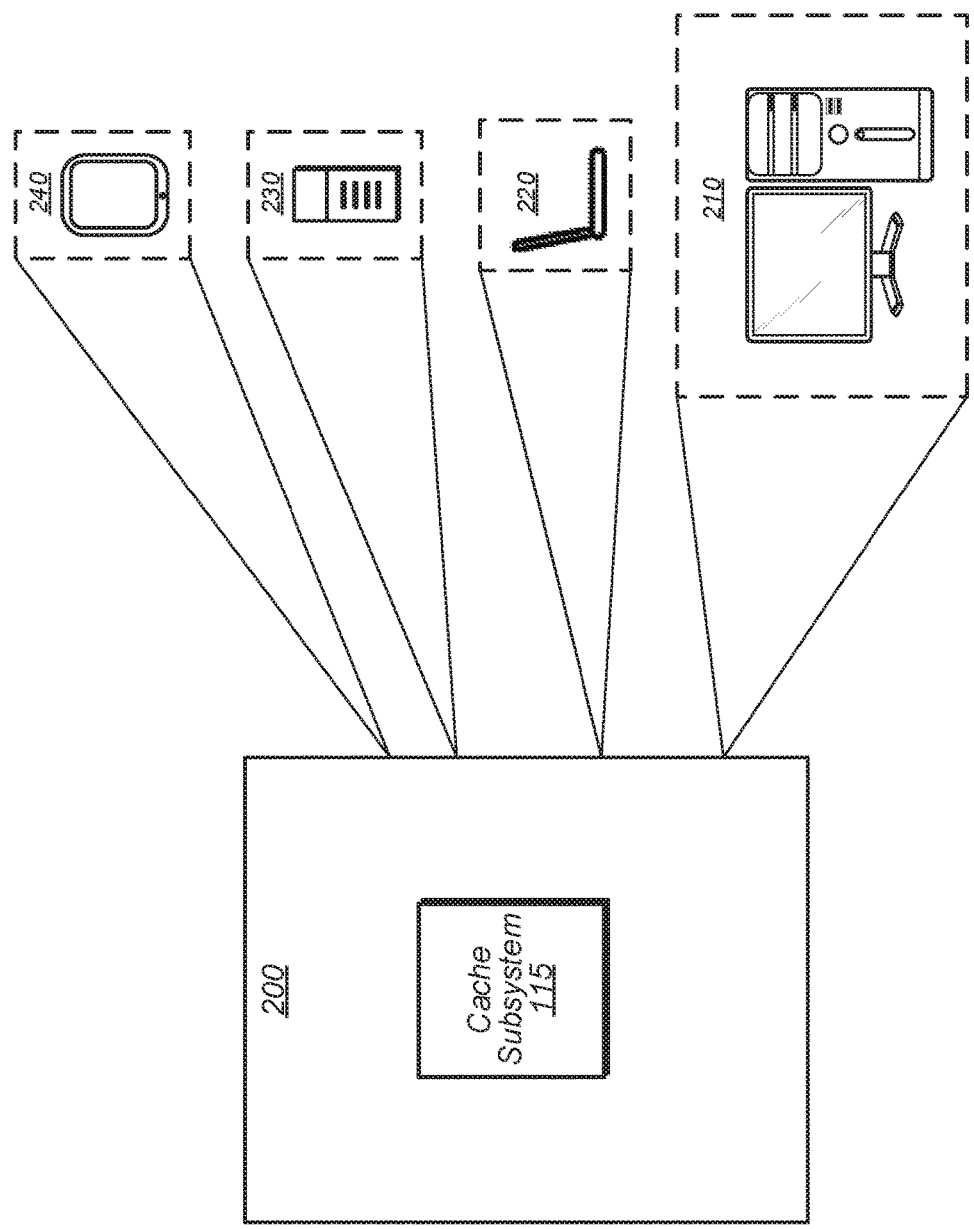
FIG. 2 is a block diagram of one implementation of a computing system.

Turning now to FIG. 2, a block diagram of one implementation of a computing system 200 is shown. As shown, system 200 represents chip, circuitry, components, etc., of a desktop computer 210, laptop computer 220, server 230, mobile device 240, or otherwise. Other devices are possible and are contemplated. In the illustrated implementation, the system 200 includes at least one instance of cache subsystem 115 (of FIG. 1). Although not shown in FIG. 2, system 200 can also include any number and type of other components, such as one or more processors, one or more memory devices, one or more peripheral devices, and so on. Cache subsystem 115 includes any number of cache levels which employ cache management schemes based on access type priority.

Figure 3:
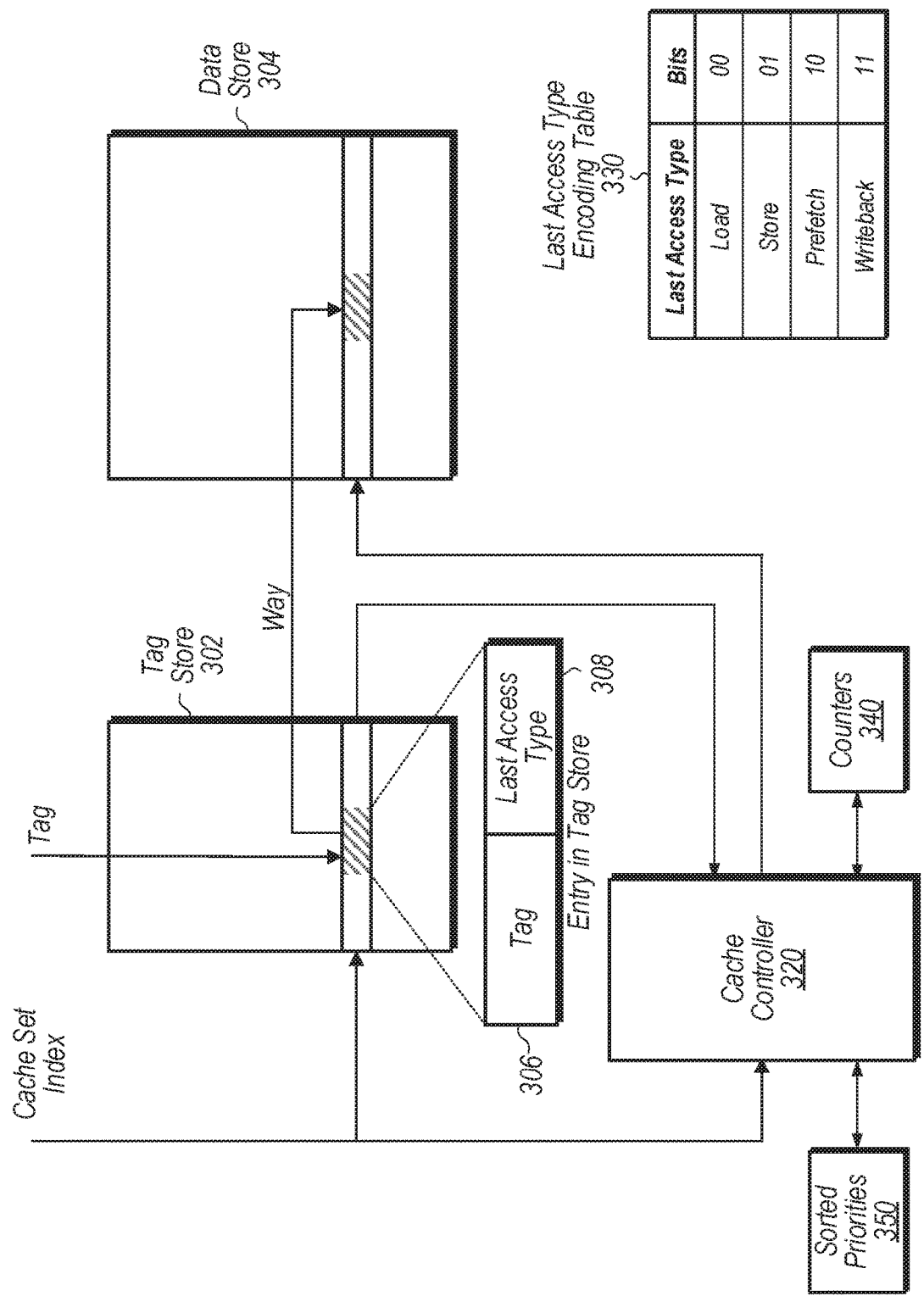
FIG. 3 is a block diagram of one implementation of a cache that tracks a last access type for each cache line.

Referring now to FIG. 3, a block diagram of one implementation of a cache 300 that tracks a last access type for each cache line is shown. In various implementations, cache 300 is a low latency, high bandwidth memory separate from system memory. In some implementations, cache 300 is used as a last-level cache in a cache memory subsystem (e.g., cache subsystem 115 of FIG. 1). In other implementations, cache 300 is another level within the cache memory subsystem.

When a read or write request is received by cache 300, a lookup of tag store 302 is performed using the tag of the address targeted by the request. If the lookup results in a hit and an access is performed to a cache line of data store 304, the access type is stored in last access type field 308 of the corresponding entry 306 of tag storage 302. In one embodiment, the tag store 302 and data store 304 are organized as arrays, but other organizations are possible and are contemplated. In some embodiments, each of tag storage 302 and data storage 304 are distinct entities, while in other embodiments they are combined in a single storage entity (device). In either case, the tag 302 and data 304 stores may simply be referred to as a data store or data storage device. In one implementation, the different possible access types include load, store, prefetch, and writeback. As used herein, a "load operation" or "load access" is defined as an operation specifying a transfer of data from a memory location to a processor or execution unit. A "store operation" or "store access" is defined as an operation specifying a transfer of data from a processor or execution unit to a memory location. A "prefetch operation" or "prefetch access" is defined as an operation specifying a transfer of data from a memory location into a cache prior to the data being requested by a demand operation. The data targeted by the prefetch access might not end up being used by an execution unit if based on an incorrect prediction. A "writeback operation" or "writeback access" is defined as a transfer of a dirty cache line to a lower level cache or to a memory location. A "dirty cache line" is defined as a cache line that has been modified and not yet written to a lower level cache or to main memory.

If the lookup to tag store 302 misses and a cache line will be allocated for the request, then cache controller 320 determines which cache line to evict so as to be able to store the new cache line. In one implementation, cache controller 320 uses the last access type field 308 stored in each entry in the corresponding set of the tag store 302 to determine which cache line to evict from data store 304. For example, in one implementation, cache controller 320 retrieves sorted priorities 350 which list the priority associated with each access type. Once cache controller 320 has retrieved sorted priorities 350, cache controller 320 searches for a cache line which has a last access type with the lowest priority according to sorted priorities 350. It is noted that cache controller 320 can also be referred to as a control unit or control logic.

In one implementation, cache 300 includes counters 340 to track the number of demand hits for each access type. A demand hit refers to a load or store operation hitting an entry in tag store 302. In one implementation, counters 340 include a counter for each different access type. For example, the counter 340 for the prefetch access type is incremented when a demand access hits on a cache line whose last access type field 308 is encoded with the prefetch encoding. In one implementation, the values of counters 340 are used to decide the priority of each access type. For example, the larger the counter value, the higher the priority of the corresponding access type. In one implementation, on a periodic basis, cache controller 320 retrieves the values of counters 340 and sorts the values in descending order. Cache controller 320 then generates sorted priorities 350 based on the sorted values of counters 340, with the highest priority assigned to the access type whose counter has the highest value. The other access types are assigned priorities in descending order based on the values of their counters.

One example of last access type encodings that can be used in accordance with one implementation are shown in last access type encoding table 330. For example, bits "00" indicate that the last access type was a load. For bits "01", this indicates that the last access type was a store. For bits "10", this indicates that the last access type was a prefetch. For bits "11", this indicates that the last access type was a writeback. In other implementations, the last access type field 308 of the entry in tag store 302 can have other numbers of bits besides two. Also, in other implementations, other encodings can be used different from the ones shown in last access type encoding table 330.

Figure 4:
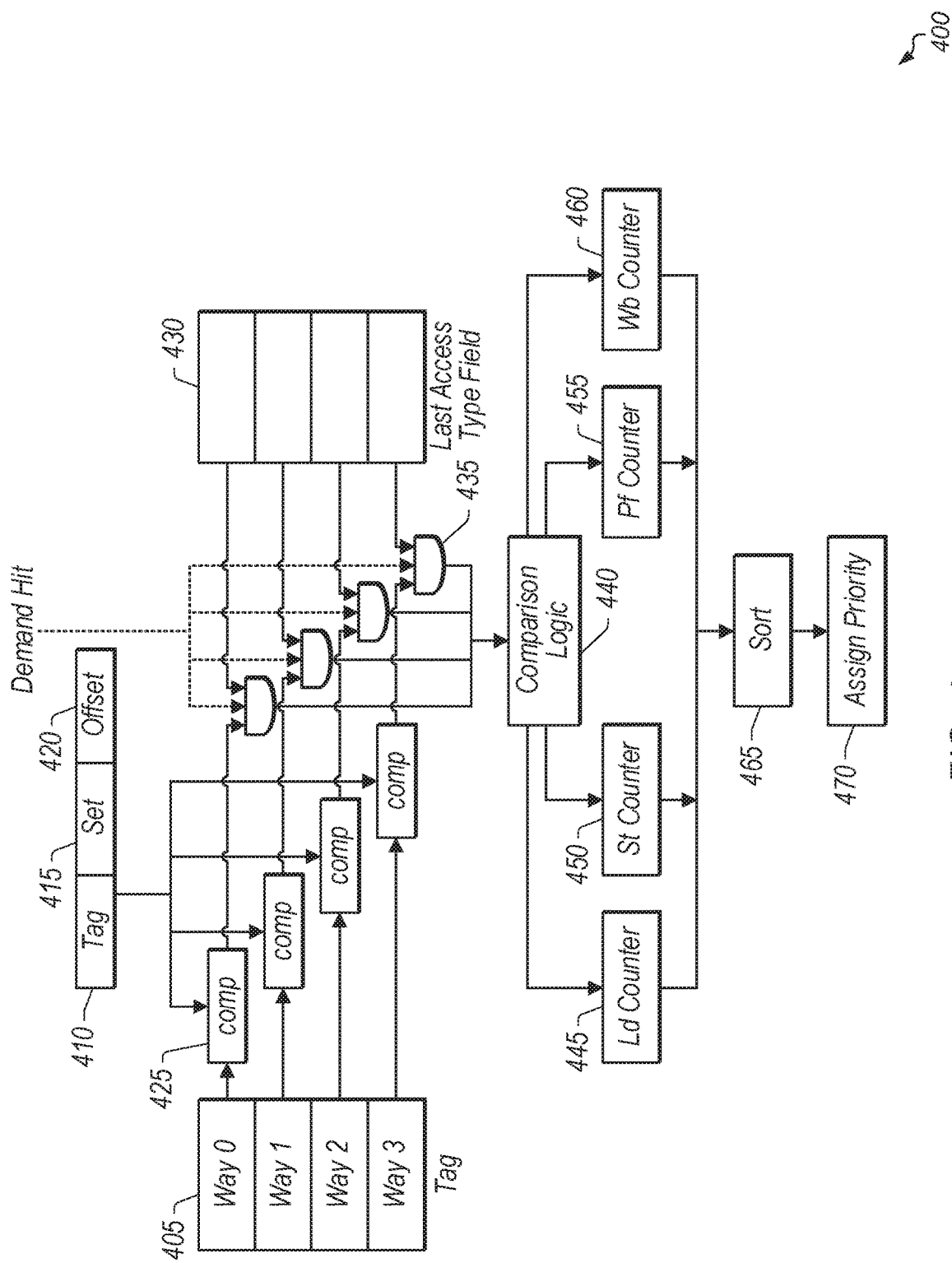
FIG. 4 is a block diagram of one implementation of a cache that maintains counters for tracking how many demand hits are caused by each access type.

Turning now to FIG. 4, a block diagram of one implementation of a cache 400 that maintains counters for tracking how many demand hits are caused by each access type is shown. When a lookup is performed of cache 400 for a given address, the tag 410, set 415, and offset 420 portions of the given address are used to access the various structures of cache 400. The set portion 415 of the address is used to select a given set of cache 400 and then the tag portion 410 of the address is compared by comparators 425 to the tags stored in ways 405 of the given set. In the illustrated example, the given set of cache 400 includes four ways 405 (way 0 to way 3), but more or fewer ways can be implemented in other caches.

If a match is found in one of the ways 405 for the tag portion 410 of the address, then the last access type is retrieved from the corresponding last access type field 430. If the access is a demand hit (i.e., a load hit or a store hit), then the last access type is provided to comparison logic 440. Depending on the last access type, the corresponding counter is incremented. For example, if the last access type was a load, then load counter 445 is incremented. If the last access type was a store, then store counter 450 is incremented. If the last access type was a prefetch, then prefetch counter 455 is incremented. Otherwise, if the last access type was a writeback, then writeback counter 460 is incremented.

When the number of accesses reaches some programmable threshold number, then the cache controller performs a sort phase 465 to sort the counters 445, 450, 455, and 460 in descending order according to their counts. Then, the cache controller performs an assign priority phase 470 to assign priorities to the sorted counters 445, 450, 455, and 460. The counter with the highest count gets the highest priority, the counter with the next highest count gets the next highest priority, and so on. The priorities are then used to determine the replacement policy when the cache controller is searching for a cache line to evict. In other words, when the cache controller needs to evict a cache line, the cache controller evicts the cache line with the lowest priority.

Figure 5:
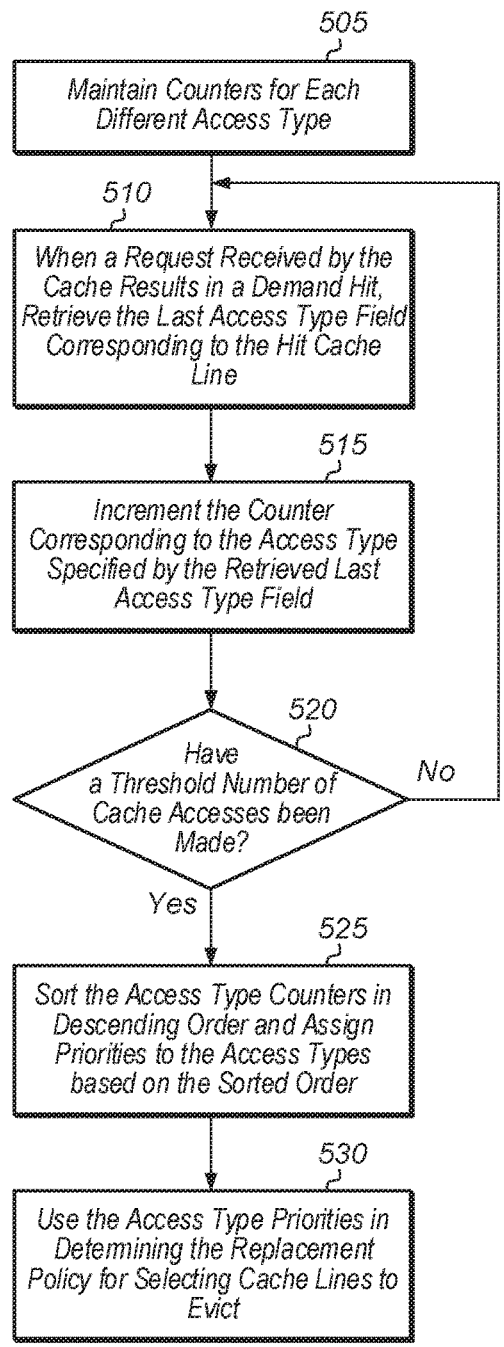
FIG. 5 is a generalized flow diagram illustrating one implementation of a method for setting priorities of cache lines based on the last access type.
Figure 6:
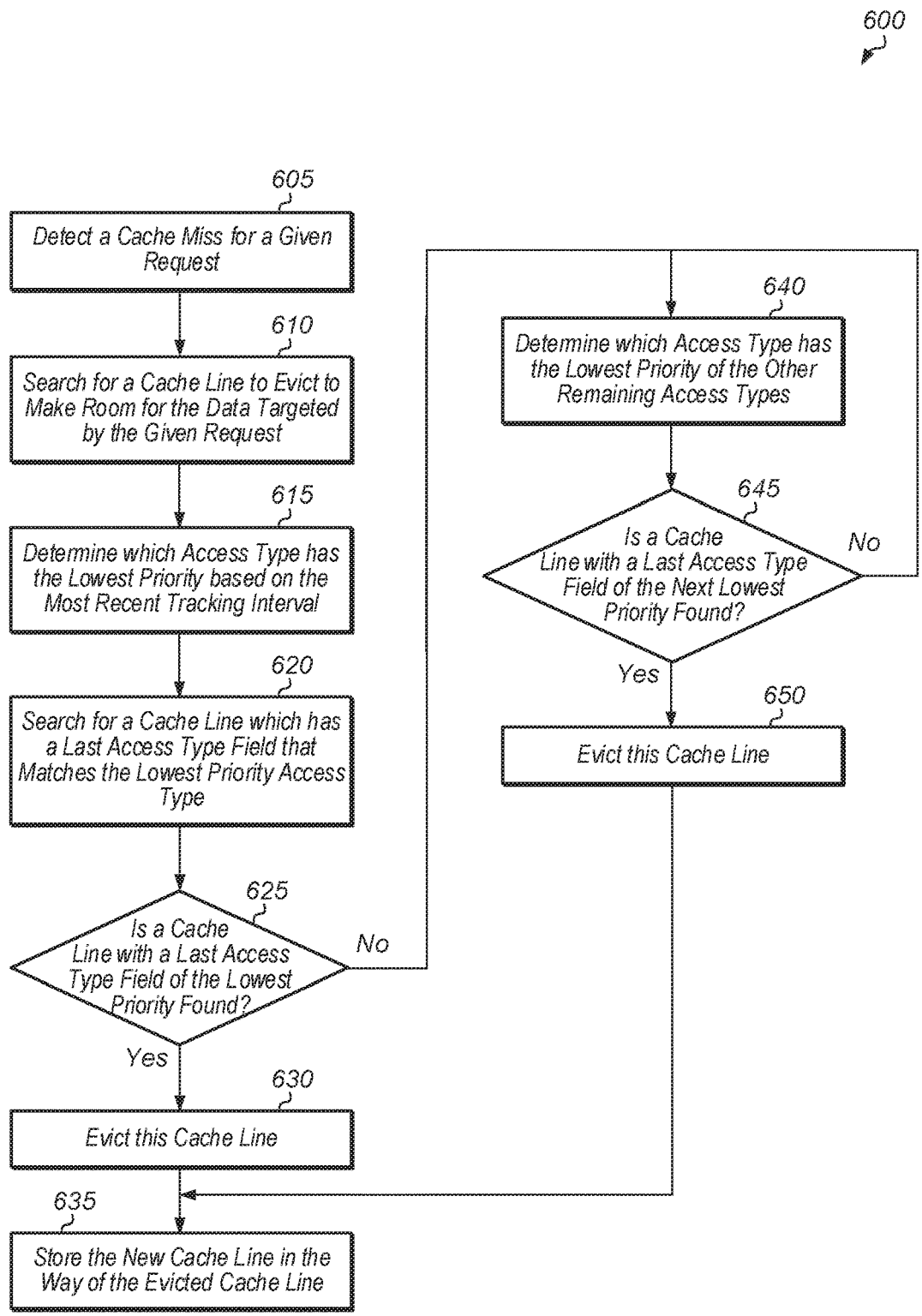
FIG. 6 is a generalized flow diagram illustrating one implementation of a method for selecting a cache line for eviction.

Referring now to FIG. 5, one implementation of a method 500 for setting priorities of cache lines based on the last access type is shown. For purposes of discussion, the steps in this implementation and those of FIG. 6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

Counters are maintained by a cache controller for each different access type (block 505). In one implementation, there are four counters for four separate access types of load, store, prefetch, and writeback. In other implementations, other numbers of counters can track other numbers of different access types. For example, in another implementation, multiple counters can track multiple different types of loads, with a first counter tracking loads from a first application, a second counter tracking loads from a second application, and so on. Other counters can track stores from each separate application, prefetches from each separate application, and writebacks from each application. In other implementations, other types of access types can be tracked by the cache controller. In one implementation, all sets in the cache share the same group of access type counters. In another implementation, there are multiple groups of counters, with each group of counters shared by a portion of the cache sets. In a further implementation, a single group of counters tracks a few representative sets rather than the entire cache.

When a request received by the cache results in a demand hit (e.g., load hit, store hit), the last access type field corresponding to the hit cache line is retrieved (block 510).

Next, the counter corresponding to the access type specified by the retrieved last access type field is incremented (block 515). If fewer than a threshold number of cache accesses have been made (conditional block 520, "no" leg), then method 500 returns to block 510. If the number of caches accesses has reached the threshold number (conditional block 520, "yes" leg), then the access type counters are sorted in descending order and priorities are assigned to the access types based on the sorted order (block 525). Next, the priorities are used in determining the replacement policy for selecting cache lines to evict (block 530). For example, if the prefetch access type counter has the lowest value of all of the counters, then the cache controller will prioritize selecting for eviction cache lines which were last accessed by a prefetch access. In another example, if the load access type counter has the highest value of all of the counters, then the cache controller will attempt to retain those cache lines which were last accessed by a load access. After block 530, method 500 ends. It is noted that method 500 can be performed periodically or in response to detecting some event (e.g., the start of a new phase of an application) to update the priorities of the different access types.

Turning now to FIG. 6, one implementation of a method 600 for selecting a cache line for eviction is shown. A cache controller detects a cache miss for a given request (block 605). In response to detecting the miss, the cache controller searches for a cache line to evict to make room for the data targeted by the given request (block 610). Next, the cache controller determines which access type has the lowest priority based on the most recent tracking interval (block 615). In various embodiments, the interval is a given period of time, a given number of clock cycles, a given number of transactions or accesses, or otherwise. One example of determining which access type has the lowest priority based on the most recent tracking interval is described in the discussion associated with method 500 (of FIG. 5). Then, the cache controller searches for a cache line which has a last access type field that matches the lowest priority access type (block 620).

If a cache line with a last access type field set to the lowest priority access type is found (conditional block 625, "yes" leg), then the cache controller evicts this cache line (block 630). Otherwise, if a cache line with a last access field set to the lowest priority access type is not found (conditional block 625, "no" leg), then the cache controller determines which access type has the lowest priority of the other remaining access types (block 640). If a cache line with a last access field set to this next lowest priority access type is found (conditional block 645, "yes" leg), then the cache controller evicts this cache line (block 650). Otherwise, if a cache line with a last access field set to this next lowest priority access type is not found (conditional block 645, "no" leg), then method 600 returns to block 640 with the cache controller determining which access type has the lowest priority of the other remaining access types. After blocks 630 and 650, the cache controller stores the new cache line in the way of the evicted cache line (block 635). After block 650, method 600 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form.

Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system, comprising:
   a processor; and
   a cache comprising circuitry configured to:
      maintain, for each of a plurality of cache lines, a last access type indication;
      maintain a plurality of counters, the plurality of counters including a separate counter for each of a plurality of different access types;
      assign a lowest priority to a given access type which corresponds to a counter that indicates a lowest number of demand hits; and
      responsive to detecting a cache miss, prioritize evicting a cache line with a last access type field that corresponds to the given access type.

2. The system as recited in claim 1, wherein in response to detecting a demand hit to a first cache line, the cache is further configured to:
   increment a first counter responsive to detecting the first cache line has a last access type field set to a prefetch access type; and
   increment a second counter responsive to detecting the first cache line has a last access type field set to a writeback access type.

3. The system as recited in claim 1, wherein the cache is configured to:
   assign a highest priority to a first access type which has a counter with a highest number of demand hits; and
   prioritize retaining cache lines that have a last access type field set to the first access type.

4. The system as recited in claim 1, wherein the cache is further configured to sort the plurality of counters according to a number of demand hits per counter over a most recent time interval.

5. The system as recited in claim 1, wherein the cache is further configured to store the last access type indication in a last access type field of a first tag entry for a corresponding cache line.

6. The system as recited in claim 1, wherein a demand hit is a cache access that hits on the cache.

7. The system as recited in claim 1, wherein the plurality of different access types include load, store, prefetch, and writeback access types.

8. A method, comprising:
   maintaining, by circuitry of a cache for each of a plurality of cache lines, a last access type;
   maintaining a plurality of counters, the plurality of counters including a separate counter for each of a plurality of different access types;
   assigning a lowest priority to a given access type which corresponds to a counter that indicates a lowest number of demand hits; and
   responsive to detecting a cache miss, prioritizing evicting a cache line with a last access type field that corresponds to the given access type.

9. The method as recited in claim 8, wherein in response to detecting a demand hit to a first cache line, the method further comprises:
   incrementing a first counter responsive to detecting the first cache line has a last access type field set to a prefetch access type; and
   incrementing a second counter responsive to detecting the first cache line has a last access type field set to a writeback access type.

10. The method as recited in claim 8, further comprising:
    assigning a highest priority to a first access type which has a counter with a highest number of demand hits out of the plurality of counters; and
    prioritizing retaining cache lines with a last access type field set to the first access type.

11. The method as recited in claim 8, further comprising sorting the plurality of counters according to a number of demand hits per counter over a most recent time interval.

12. The method as recited in claim 8, further comprising storing the last access type indication in a last access type field of a first tag entry for a corresponding cache line.

13. The method as recited in claim 8, wherein a demand hit is a cache access that hits on the cache.

14. The method as recited in claim 8, wherein the plurality of different access types include load, store, prefetch, and writeback access types.

15. A cache, comprising:
    a data store; and
    a cache controller comprising circuitry configured to:
       maintain, for each of a plurality of cache lines, a last access type indication;
       maintain a plurality of counters, the plurality of counters including a separate counter for each of a plurality of different access types;
       assign a lowest priority to a given access type which corresponds to a counter that indicates a lowest number of demand hits; and
       responsive to detecting a cache miss, prioritize evicting a cache line with a last access type field that corresponds to the given access type.

16. The cache as recited in claim 15, wherein in response to detecting a demand hit to a first cache line, the cache controller is further configured to:
    increment a first counter responsive to detecting the first cache line has a last access type field set to a prefetch access type; and
    increment a second counter responsive to detecting the first cache line has a last access type field set to a writeback access type.

17. The cache as recited in claim 15, wherein the cache controller is further configured to:
    assign a highest priority to a first access type which has a counter with a highest number of demand hits out of the plurality of counters; and
    prioritize retaining cache lines with a last access type field set to the first access type.

18. The cache as recited in claim 15, wherein the cache controller is further configured to sort the plurality of counters according to a number of demand hits per counter over a most recent time interval.

19. The cache as recited in claim 15, wherein a demand hit is a cache access that hits on the cache.

20. The cache as recited in claim 15, wherein the plurality of different access types include load, store, prefetch, and writeback access types.

\* \* \* \* \*